United States Patent
Hosokawa et al.

(10) Patent No.: US 9,673,589 B2
(45) Date of Patent: Jun. 6, 2017

(54) AMPLIFICATION OPTICAL FIBER AND OPTICAL FIBER AMPLIFIER

(71) Applicants: FUJIKURA LTD., Tokyo (JP); NIPPON TELEGRAPH AND TELEPHONE CORPORATION, Tokyo (JP); OSAKA PREFECTURE UNIVERSITY PUBLIC CORPORATION, Sakai-shi, Osaka (JP)

(72) Inventors: Tsukasa Hosokawa, Sakura (JP); Kentaro Ichii, Sakura (JP); Katsuhiro Takenaga, Sakura (JP); Shoichiro Matsuo, Sakura (JP); Hirotaka Ono, Atsugi (JP); Makoto Yamada, Sakai (JP)

(73) Assignees: FUJIKURA LTD., Tokyo (JP); NIPPON TELEGRAPH AND TELEPHONE CORPORATION, Tokyo (JP); OSAKA PREFECTURE UNIVERSITY PUBLIC CORPORATION, Sakai-Shi, Osaka (JP)

( * ) Notice: Subject to any disclaimer, the term of this patent is extended or adjusted under 35 U.S.C. 154(b) by 0 days.

(21) Appl. No.: 15/236,937

(22) Filed: Aug. 15, 2016

(65) Prior Publication Data

US 2017/0054266 A1 Feb. 23, 2017

(30) Foreign Application Priority Data

Aug. 18, 2015 (JP) .................. 2015-161413

(51) Int. Cl.
| | |
|---|---|
| H01S 3/067 | (2006.01) |
| H01S 3/094 | (2006.01) |
| G02B 6/12 | (2006.01) |
| H01S 3/16 | (2006.01) |

(52) U.S. Cl.
CPC ........ *H01S 3/06725* (2013.01); *H01S 3/0672* (2013.01); *H01S 3/06729* (2013.01);
(Continued)

(58) Field of Classification Search
CPC ............. H01S 3/06725; H01S 3/06729; H01S 3/094069; G02B 2006/1209
See application file for complete search history.

(56) References Cited

U.S. PATENT DOCUMENTS

| | | | |
|---|---|---|---|
| 5,185,827 | A | 2/1993 | Poole |
| 2004/0233514 | A1 | 11/2004 | Takagi et al. |

(Continued)

FOREIGN PATENT DOCUMENTS

| | | |
|---|---|---|
| JP | 07-63938 A | 3/1995 |
| JP | 11-72640 A | 3/1999 |

(Continued)

OTHER PUBLICATIONS

Askarov et al., "Design of multi-mode Erbium-doped fiber amplifiers for low mode-dependent gain" IEEE Summer Topical on Spatial Multiplexing, 2012.*

(Continued)

*Primary Examiner* — Eric Bolda
(74) *Attorney, Agent, or Firm* — Westerman, Hattori, Daniels & Adrian, LLP

(57) ABSTRACT

An amplification optical fiber operable to propagate light beams in a plurality of modes in a predetermined wavelength range through a core doped with a rare earth element, wherein Expression (1) is satisfied, where a cutoff wavelength of a propagated highest mode light beam is defined as $\lambda max$, under conditions in which the cutoff wavelength of the highest mode light beam is defined as $\lambda c$, a shortest wavelength of the wavelength range is defined as $\lambda min$, and a cutoff wavelength of a second-highest mode light beam to the highest mode light beam is $\lambda min$.

$$\lambda c > 0.5\ \lambda min + 0.5\ \lambda max \qquad (1).$$

7 Claims, 4 Drawing Sheets

(52) U.S. Cl.
CPC ...... *H01S 3/094069* (2013.01); *H01S 3/1603* (2013.01); *G02B 2006/1209* (2013.01)

(56) References Cited

U.S. PATENT DOCUMENTS

2013/0182314 A1    7/2013  Bennett et al.
2016/0268757 A1*   9/2016  Hosokawa .......... H01S 3/06729

FOREIGN PATENT DOCUMENTS

| JP | 11-251663 A | 9/1999 |
|----|-------------|--------|
| JP | 2004-250251 A | 9/2004 |
| JP | 2014-170850 A | 9/2014 |
| JP | 2015-045703 A | 3/2015 |
| JP | 2015-507361 A | 3/2015 |
| WO | 2014/021894 A2 | 2/2014 |

OTHER PUBLICATIONS

Yung et al., "First demonstration of multimode amplifier for spatial division multiplexed transmission systems," Proc. ECOC '11, Th.13.K4, 2011 (3 pages).

Cocq et al., "Modeling and characterization of a few-mode EDFA supporting four mode groups for mode division multiplexing," Opt. Express 20, 27051-27061, 2012, (11 pages).

Office Action dated Mar. 28, 2017, issued in counterpart Japanese Patent Application No. 2015-161413, with English translation. (11 pages).

\* cited by examiner

AMPLIFICATION OPTICAL FIBER AND OPTICAL FIBER AMPLIFIER

BACKGROUND OF THE INVENTION

The present invention relates to an amplification optical fiber for use in optical communications and an optical fiber amplifier, which are suited to the case of reducing differential modal gain.

In optical communications, signals are superposed on a light beam propagated through an optical fiber for communications. In order to increase information volumes transmitted through one core in such optical communications, few-mode communications are known, in which information is superposed on a light beam in an $LP_{01}$ mode (a fundamental mode) of a signal light beam and information is also superposed on a light beam in a mode higher than the $LP_{01}$ mode for information communications. Therefore, in the case of amplifying a signal light beam propagated through an optical fiber using an optical fiber amplifier, it is necessary to amplify light beams in individual modes propagated through the optical fiber.

Non-Patent Literature 1 describes an amplification optical fiber like this. In the amplification optical fiber described in Non-Patent Literature 1, the refractive index of its core is a step type, i.e. the refractive index in the inside of the core is constant in the radial direction. The core is doped with erbium. The concentration of erbium is constant in the inside of the core. However, in the case of amplifying light beams using this amplification optical fiber, the difference between the gain of the $LP_{01}$ mode light beam and the gain of the LP11 mode light beam, i.e. differential modal gain (DMG), is sometimes increased.

Therefore, Non-Patent Literature 2 describes an amplification optical fiber aimed for reducing such differential modal gain. The amplification optical fiber described in Non-Patent Literature 2 has the refractive index profile of its core similar to that of the amplification optical fiber described in Non-Patent Literature 1. However, the center region including the center axis of the core is not doped with erbium, and the outer circumferential region surrounding the center region is doped with erbium. The power of the $LP_{01}$ mode light beam is made equal to the power of the $LP_{11}$ mode light, beam propagated through the region to which erbium is doped, and thus the gain of the $LP_{01}$ mode light beam is matched with the gain of the $LP_{11}$ mode light beam.

[Non-Patent Literature 1] Y. Yung et al., "First demonstration of multimode amplifier for spatial division multiplexed transmission systems," Proc. ECOC '11, Th.13.K4 (2011)

[Non-Patent Literature 2] G. Le Cocq et al., "Modeling and characterization of a few-mode EDFA. supporting four mode groups for mode division multiplexing," Opt. Express 20, 27051-27061 (2012)

SUMMARY OF THE INVENTION

However, even in the amplification optical fiber described in Non-Patent Literature 2, the gains of the $LP_{01}$ mode and the $LP_{11}$ mode light beams are sometimes varied. The refractive index profile of the core of the amplification optical fiber described in Non-Patent Literature 2 has to be a so-called ring type. Thus, regardless of the refractive index profile of the core, it is demanded to reduce differential modal gain.

The amplification optical fibers described in Non-Patent Literature 1 and Non-Patent Literature 2 are a two-mode optical fiber through which the $LP_{01}$ mode and the $LP_{11}$ mode light beams are propagated. However, even in the case in which light beams in higher modes are propagated, it. is desired to decrease the difference between the gains of the propagated light beams in the individual modes.

Therefore, an object of the present invention is to provide an optical fiber that can reduce differential modal gain and an optical fiber amplifier.

In order to solve the problem, the present inventors dedicatedly investigated a method that can reduce differential modal gain regardless of the refractive index profile of a core and the concentration distribution of a rare earth element. As a result, the present inventors found a new finding in which differential modal gain becomes smaller as the cutoff wavelength of the highest mode light beam propagated through the core becomes longer. Therefore, the present inventors made the present invention.

The present invention is an amplification optical fiber operable to propagate light beams in a plurality of modes in a predetermined wavelength range through a core doped with a rare earth element, wherein Expression (1) is satisfied, where a cutoff wavelength of a propagated highest mode light beam is defined as λmax, under conditions in which the cutoff wavelength of the highest mode light beam is defined as λc, a shortest wavelength of the wavelength range is defined as λmin, and a cutoff wavelength of a second-highest mode light beam to the highest mode light beam is λmin.

$$\lambda c > 0.5\ \lambda min + 0.5\ \lambda max \quad (1)$$

In optical communications, the wavelength range of light beams for communications is defined. For example, the C-band is a wavelength range of 1,530 to 1,565 nm, and the L-band is a wavelength range of 1,565 to 1,625 nm. Thus, in the case in which a predetermined wavelength range is the C-band, λmin is a wavelength of 1,530 nm. In this case, suppose that the amplification optical fiber is a two-mode optical fiber operable to propagate the $LP_{01}$ mode and the $LP_{11}$ mode light beams in this wavelength range, the mode of a light beam that appears subsequent to the $LP_{11}$ mode light beam is the $LP_{21}$ mode. Thus, λmax is the cutoff wavelength of the $LP_{11}$ mode light beam in the state in which the cutoff wavelength of the $LP_{21}$ mode light beam is a wavelength of 1,530 nm. As described above, it was found that differential modal gain becomes smaller as the cutoff wavelength of the highest mode light beam propagated through the core becomes longer. Therefore, the present inventors found that the cutoff wavelength of the highest mode light beam satisfies Expression (1), which provides a sufficiently small differential modal gain. Accordingly, the amplification optical fiber according to an aspect of the present invention that satisfies Expression (1) can make differential modal gain sufficiently small.

An aspect of the present invention is an optical fiber amplifier including the above amplification optical fiber and a pumping light source operable to emit pumping light entered to the core.

As described above, the amplification optical fiber according to an aspect of the present invention can make differential modal gain sufficiently small. Thus, the optical fiber amplifier using the amplification optical fiber is preferably used for an optical fiber amplifier for few-mode communications that, can make differential modal gain sufficiently small.

The amplification optical fiber preferably satisfies Expression (2).

$$\lambda c > 0.25\ \lambda min + 0.75\ \lambda max \quad (2)$$

The cutoff wavelength of the propagated highest mode light beam satisfies Expression (2). Thus, differential modal gain can be further reduced. Note that, in the case in which the cutoff wavelength λc satisfies Expression (2) from the definitions of λmin and λmax, λc satisfies Expression (1).

The predetermined wavelength range may be a wavelength range of 1,530 to 1,565 nm, inclusive. In this case, the amplification optical fiber and the optical fiber amplifier can be used for optical communications in the C-band.

Preferably, the core has an inner core doped with no rare earth element and an outer core surrounding an outer circumferential surface of the inner core and doped with a rare earth element. A relative refractive index difference between the inner core and a cladding is smaller than a relative refractive index difference between the outer core and the cladding.

Such an amplification optical fiber is referred to as a ring type amplification optical fiber, because a region having a high refractive index has a ring type profile. Such an amplification optical fiber can further reduce differential modal gain, compared with a step type amplification optical fiber having a uniform refractive index of the core.

The plurality of modes may be an $LP_{01}$ mode and an $LP_{11}$ mode. In this case, in two-mode optical communications, light beams in the modes can be amplified with differential modal gain being reduced.

The plurality of modes may be an $LP_{01}$ mode, an $LP_{11}$ mode, an $LP_{21}$ mode, and an $LP_{02}$ mode. In this case, in four-mode optical communications, light beams in these modes can be amplified with differential modal gain being reduced.

As described above, according to an aspect of the present invention, there are provided an amplification optical fiber that can reduce differential modal gain and an optical fiber amplifier.

DETAILED DESCRIPTION OF THE INVENTION

Figure 1:
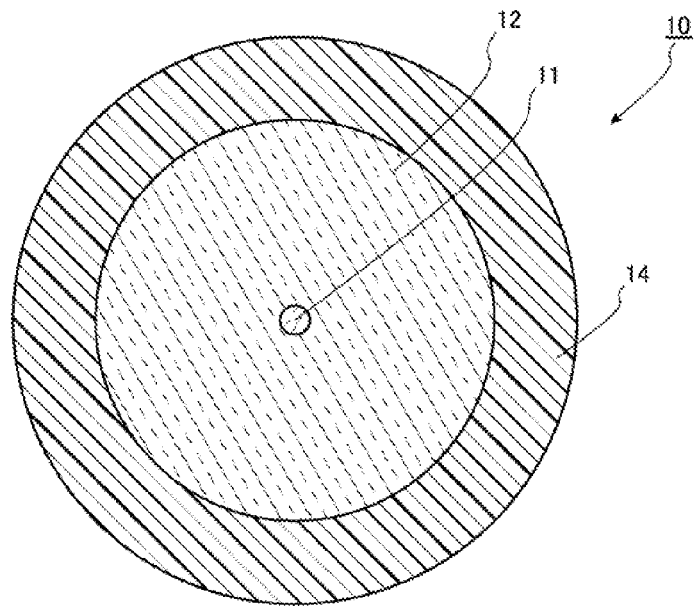
FIG. 1 is a diagram of a cross section perpendicular to the longitudinal direction of an amplification optical fiber according to an embodiment of the present invention.

In the following, preferred embodiments of an amplification optical fiber according to an aspect of the present invention and an optical fiber amplifier will be described in detail with reference to the drawings. Note that, for easy understanding, scales in the drawings are sometimes different from scales in the following description.

<Description of an Amplification Optical Fiber>

FIG. 1 is a diagram of a cross section perpendicular to the longitudinal direction of an amplification optical fiber according to an embodiment of the present invention. As illustrated in FIG. 1, an amplification optical fiber 10 includes a core 11, a cladding 12 surrounding the outer circumferential surface of the core 11 with no gap, and a buffer layer 14 enclosing the cladding 12. The refractive index of the cladding 12 is lower than the refractive index of the core 11. The refractive indexe of the core 11 is uniform and the refractive index of the cladding 12 is the uniform in the radial direction. In other words, the core 11 of the amplification optical fiber 10 has a step type refractive index profile. In the embodiment, the diameter of the core 11 is 10 μm, for example. The outer diameter of the cladding 12 is 125 μm, for example.

A material configuring this core 11 includes, for example, silica doped with an element, such as germanium, which increases the refractive index, and a rare earth element, such as erbium (Er), which is pumped with pumping light. In addition to erbium, the rare earth element includes ytterbium (Yb), thulium (Tm), cerium (Ce), neodymium (Nd), europium (Eu), and the like. The core 11 of the amplification optical fiber 10 according to the embodiment is uniformly entirely doped with a rare earth element. A material configuring the cladding 12 includes, for example, pure silica doped with no dopant. A material configuring the buffer layer 14 includes, for example, an ultraviolet curing resin.

The amplification optical fiber 10 propagates light beams in a plurality of modes in a predetermined wavelength range. For example, the amplification optical fiber 10 is a few-mode optical fiber operable to propagate an $LP_{01}$ mode light beam and an $LP_{11}$ mode light beam in the C-band, in which a predetermined wavelength range is a range of 1,530 to 1,565 nm, inclusive. For example, the amplification optical fiber 10 is a few-mode optical fiber operable to propagate the $LP_{01}$ mode light beam, the $LP_{11}$ mode light beam, an $LP_{21}$ mode light beam, and an $LP_{02}$ mode light beam in the C-band.

Figure 2:
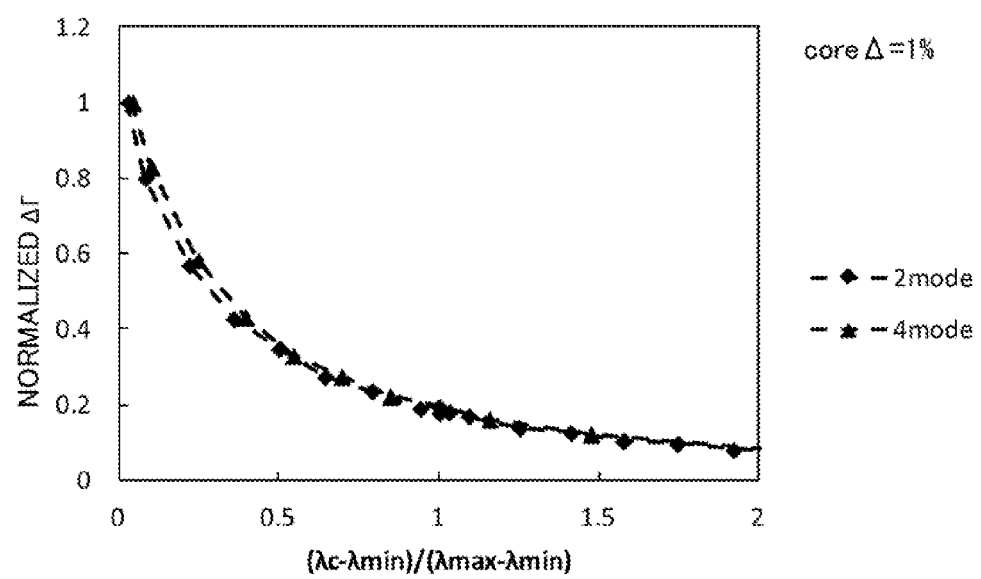
FIG. 2 is a diagram of the relationship between the cutoff wavelength of a highest mode light beam propagated through the amplification optical fiber in FIG. 1 and a normalized ΔΓ.

FIG. 2 is a diagram of the relationship between a cutoff wavelength λc of the highest mode light beam propagated through the amplification optical fiber 10 according to the embodiment having a step type refractive index profile and a normalized ΔΓ. The normalized ΔΓ can be defined as below. First, the sum total of the power of the $LP_{01}$ mode light beam propagated through a region doped with a rare earth element is defined as $\Gamma_{01}$, and the sum total of the power of the highest mode light beam propagated through the doped region is defined as $\Gamma_{max}$. Commonly, in light beams propagated through the core of the optical fiber, a higher mode light beam tends to spread. Thus, the power of a higher mode light beam becomes smaller in a region in which the light beam has more overlaps with the core. In the embodiment, the core is entirely doped with a rare earth element as described above. Thus, $\Gamma_{01}$ becomes the largest, and $\Gamma_{max}$ becomes the smallest. ΔΓ is defined as the difference between $\Gamma_{01}$ and $\Gamma_{max}$.

For example, in the case in which the amplification optical fiber 10 is a two-mode optical fiber operable to propagate the $LP_{01}$ mode and the $LP_{11}$ mode light beams, the highest mode light beam propagated through the amplification optical fiber 10 is the $LP_{11}$ mode light beam. Thus, in the case in which the sum total of the power of the $LF_{11}$ mode light beam propagated through the region doped with a rare earth element is defined as $\Gamma_{11}$, $\Delta\Gamma$ is the difference between $\Gamma_{01}$ and $\Gamma_{11}$. For example, in the case in which the amplification optical fiber 10 is a four-mode optical fiber operable to propagate the $LP_{01}$ mode light beam, the $LP_{11}$ mode light beam, the $LP_{21}$ mode light beam, and the $LP_{02}$ mode light beam, the highest mode light beam propagated through the amplification optical fiber 10 is the $LP_{02}$ mode light beam. Thus, in the case in which the sum total of the power of the $LP_{02}$ mode light beam propagated through the region doped with a rare earth element is defined as $\Gamma_{02}$, $\Delta\Gamma$ is the difference between $\Gamma_{01}$ and $\Gamma_{02}$. FIG. 2 is a diagram of the relationship between the cutoff wavelength $\lambda c$ of the highest mode light beam propagated through the amplification optical fiber 10 and the normalised $\Delta\Gamma$ for the two-mode optical fiber and the four-mode optical fiber.

Note that, in FIG. 2, the relative refractive index difference between the core 11 and the cladding 12 is 1%, the wavelength of a light beam propagated through the core 11 is a wavelength of 1550 nm, and the amplification optical fiber 10 propagates light beams in the C-band.

As described above, $\lambda c$ is defined as the cutoff wavelength of the highest mode light beam propagated through the amplification optical fiber 10. Thus, for example, in the case in which the amplification optical fiber 10 is a two-mode optical fiber, $\lambda c$ is defined as the cutoff wavelength of the $LP_{11}$ mode light beam. In the case in which the amplification optical fiber 10 is a four-mode optical fiber, $\lambda c$ is defined as the cutoff wavelength of the $LP_{02}$ mode light beam. $\lambda min$ is defined as the shortest wavelength of a light beam in a predetermined wavelength range propagated through the amplification optical fiber 10. Thus, in the case in which the amplification optical fiber 10 propagates light beams in the C-band, $\lambda min$ is a wavelength of 1,530 nm. In this case, in the case in which the amplification optical fiber 10 is a two-mode optical fiber, the cutoff wavelength of the $LP_{11}$ mode light beam is a wavelength of 1,530 nm or more, which is $\lambda min$. $\lambda max$ is defined as the cutoff wavelength of the highest mode light beam in the case in which the cutoff wavelength of a second-highest mode light beam to the highest mode light beam in the propagated light beams is $\lambda min$. For example, similar to the description above, in the case in which the amplification optical fiber 10 is a two-mode optical fiber, a light beam that appears after the highest mode light beam is the $LP_{21}$ mode light beam. In the case in which the amplification optical fiber 10 is a two-mode optical fiber-like this and propagates light beams in the C-band, $\lambda max$ is the cutoff wavelength of the $LP_{11}$ mode light beam under the conditions in which the cutoff wavelength of the $LP_{21}$ mode light beam is a wavelength of 1,530 nm. In this case, $\lambda max$ is a wavelength of 2,520 nm. In the case in which the cutoff wavelength of the $LP_{11}$ mode light beam is shorter than a wavelength of $\lambda max$, the cutoff wavelength of the $LP_{21}$ mode light beam is also shorter than a wavelength of $\lambda min$. Suppose that the amplification optical fiber 10 is a two-mode optical fiber and propagates light beams in the C-band as described above. In this case, under the conditions in which the cutoff wavelength of the $LP_{11}$ mode light beam is a wavelength of 1,530 nm or more and the cutoff wavelength of the $LP_{21}$ mode light beam is shorter than a wavelength of 1,530 nm, light beams in two modes in the C-band are propagated through the amplification optical fiber 10.

In FIG. 2, the horizontal axis expresses $(\lambda c-\lambda min)/(\lambda max-\lambda min)$. Thus, at zero on the horizontal axis, the cutoff wavelength $\lambda c$ of the highest mode light beam propagated through the amplification optical fiber 10 is equal to the shortest wavelength $\lambda min$ in a predetermined wavelength range propagated through the amplification optical fiber 10. At one on the horizontal axis, $\lambda c$ is equal to the cutoff wavelength $\lambda max$ of the highest mode light beam, in the case in which the cutoff wavelength of the second-highest mode light beam to the highest mode light beam in the propagated light beams is $\lambda min$. Consequently, at one or more on the horizontal axis, the second-highest mode light beam to the highest mode light beam in the propagated light beams appears in a predetermined wavelength range, which is unnecessary to take it into account.

As illustrated in FIG. 2, the present inventors found that the normalized $\Delta\Gamma$ becomes smaller as $\lambda c$ comes closer from $\lambda min$ to $\lambda max$ and that the decrease rate of the normalized $\Delta\Gamma$ to an increase in $\lambda c$ becomes greater in a region in which $\lambda c$ comes closer to $\lambda min$. In other words, as $\lambda c$ comes closer to $\lambda min$, the normalized $\Delta\Gamma$ is suddenly increased. Thus, the amplification optical fiber 10 preferably satisfies Expression (1).

$$\lambda c > 0.5\ \lambda min + 0.5\ \lambda max \quad (1)$$

Expression (1) is satisfied, i.e. the horizontal axis is greater than 0.5. Thus, in the conditions in FIG. 2, the normalized $\Delta\Gamma$ can be made 0.35 or less. From the definition of $\Delta\Gamma$, $\Delta\Gamma$ is large, which means that differential modal gain is large. Consequently, Expression (1) is satisfied, allowing differential modal gain to be small enough.

Furthermore, the amplification optical fiber 10 preferably satisfies Expression (2).

$$\lambda c > 0.25\ \lambda min + 0.75\ \lambda max \quad (2)$$

Expression (2) is satisfied, i.e. the horizontal axis is greater than 0.75. Thus, the normalized $\Delta\Gamma$ can be made 0.30 or less. Consequently, differential modal gain can be made further smaller.

Note that, in FIG. 2, under the conditions in which the amplification optical fiber 10 is a two-mode optical fiber or a four-mode optical fiber, the relationship between the cutoff wavelength $\lambda c$ of the highest mode light beam in the propagated light beams and the normalized $\Delta\Gamma$ is shown. However, even in the case in which the amplification optical fiber 10 is a three-mode optical fiber or a five-mode optical fiber or more, the result is almost equivalent to the result in FIG. 2.

Figure 3:
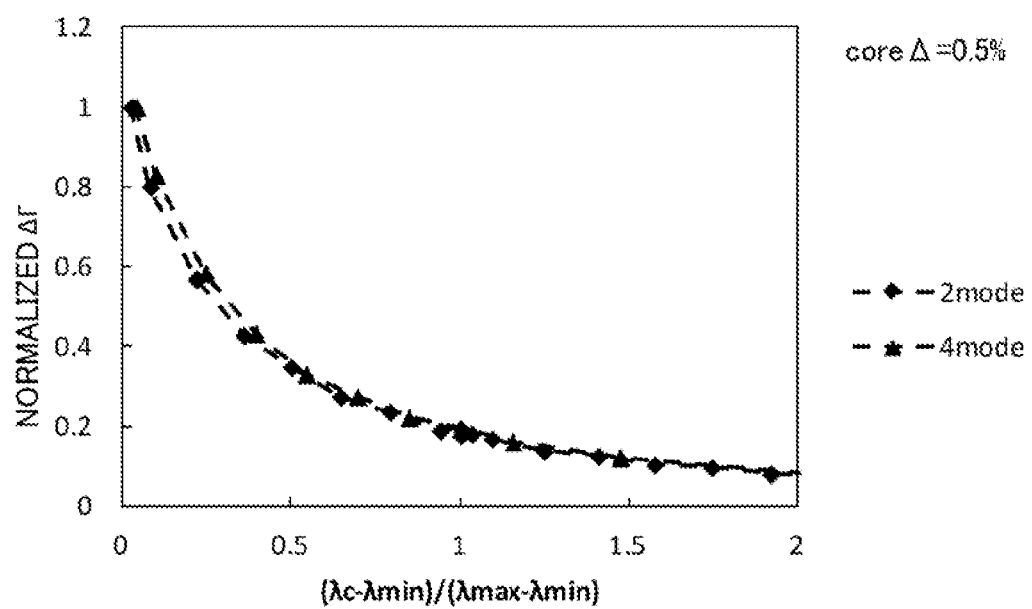
FIG. 3 is a diagram of the relationship between the cutoff wavelength of a highest mode light beam propagated through the amplification optical fiber in FIG. 1 and a normalized ΔΓ when the refractive index of a core is different from that in FIG. 2.

FIG. 3 is a diagram of the relationship similar to the relationship for the amplification optical fiber 10 in FIG. 2 in the same conditions as the conditions in FIG. 2 except that the relative refractive index difference between the core 11 and the cladding 12 is 0.5%. Also in FIG. 3, the result was almost similar to the result in FIG. 2. In other words, FIG. 3 reveals that even in the case in which the relative refractive index difference between the core 11 and the cladding 12 is different, Expression (1) is preferably satisfied, and Expression (2) is more preferably satisfied.

As described above, in accordance with the amplification optical fiber 10 according to the embodiment, Expression (1) is satisfied, and thus differential modal gain can be made sufficiently small. Expression (2) is satisfied, and thus differential modal gain can be made much smaller.

<Description of Another Amplification Optical Fiber>

Figure 4A:
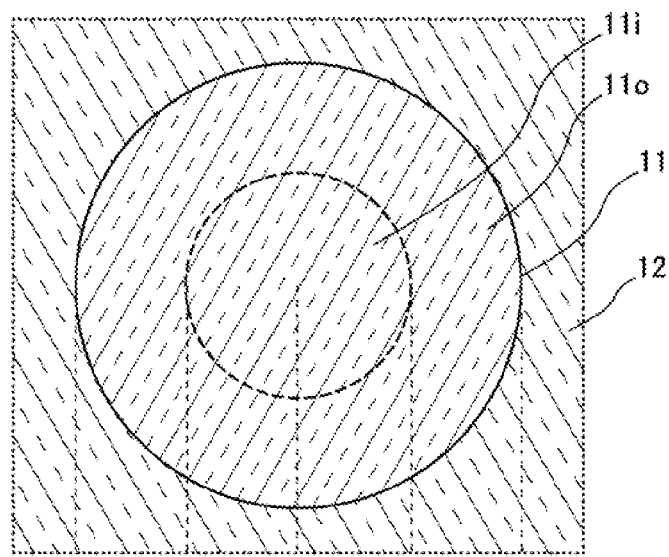
FIGS. 4A to 4C are diagrams of the structure of a core, the refractive index profile of the core, and a region doped with a rare earth element of the core when the refractive index profile of the core of the amplification optical fiber in FIG. 1 is a ring type.
Figure 4B:
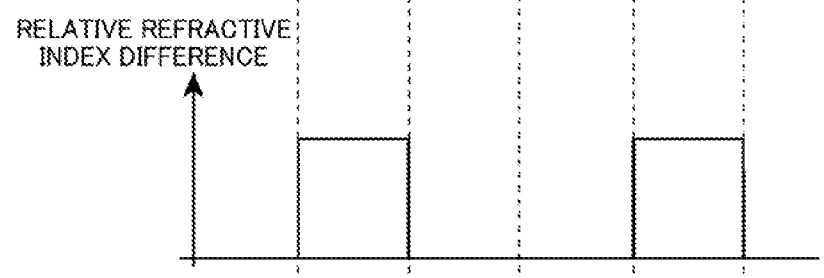
Figure 4C:
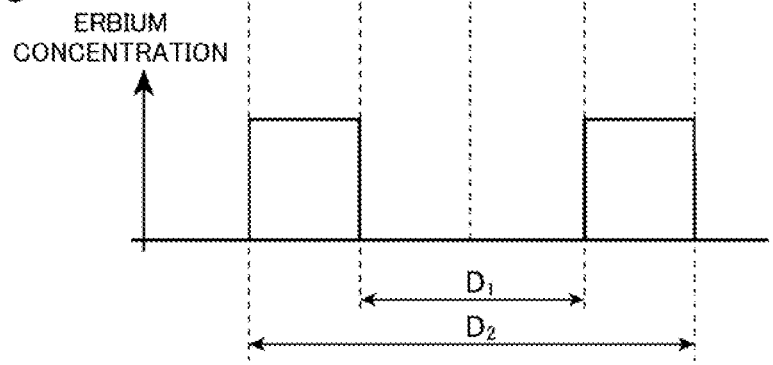

In the description above, the refractive index of the core 11 is uniform, and the core 11 is entirely doped with a rare earth element. In this embodiment,, the case in which the refractive index profile of a core 11 is a ring type will be described. Note that, in describing the embodiment, components the same as or equivalent to ones in the description of the amplification optical fiber 10 having the step type refractive index profile are designated the same reference numerals and signs, and the overlapping description is omitted, unless otherwise specified. FIGS. 4A, 4B and 4C are diagrams of the structure, refractive index profile, and region doped with a rare earth element of the core, when the refractive index profile of the core 11 of the amplification optical fiber 10 in FIG. 1 is a ring type.

As illustrated in FIG. 4A, the core 11 of an amplification optical fiber 10 according to the embodiment includes an inner core 11$i$ including the center axis and an outer core 11$o$ surrounding the outer circumferential surface of the inner core 11$i$ with no gap.

As illustrated in FIG. 4B, the refractive index of the inner core 11$i$ is lower than the refractive index of the outer core 11$o$. In the embodiment, the refractive index of the inner core 11$i$ is equal to the refractive index of the cladding 12. The relative refractive index difference between the outer core 11$o$ and the cladding 12 is 1%, for example. In order to provide this refractive index profile, for example, the outer core 11$o$ is made of silica doped with a dopant, such as germanium (Ge), which increases the refractive index. The inner core 11$i$ and the cladding 12 are made of silica doped with no dopant. Note that, in the case in which the outer core 11$o$ is made of silica doped with no dopant, the inner core 11$i$ and the cladding 12 are made of silica doped with a dopant, such as fluorine, which decreases the refractive index.

As illustrated in FIG. 4C, the outer core 11$o$ is doped with a rare earth element, such as erbium. In the embodiment, the outer core 11$o$ is entirely doped with erbium. The inner core 11$i$ is doped with no erbium.

Figure 5:
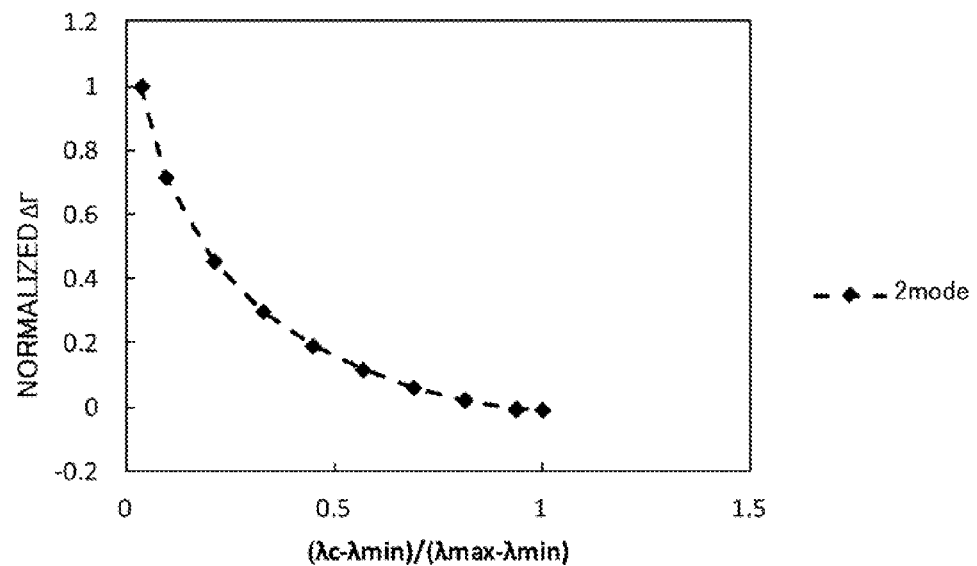
FIG. 5 is a diagram of the relationship between the cutoff wavelength of a highest mode light beam propagated through the amplification optical fiber in FIGS. 4A to 4C and a normalized ΔΓ.

FIG. 5, which is similar to FIG. 2, illustrates the amplification optical fiber 10. FIG. 5 is a diagram of the relationship between the cutoff wavelength of the highest mode light beam propagated through the amplification optical fiber 10 having the refractive index profile in FIGS. 4A, 4B and 4C and the normalized $\Delta\Gamma$. Note that, FIG. 5 illustrates the case in which the amplification optical fiber 10 is a two-mode optical fiber. Here, in FIG. 5, the refractive index of the inner core 11$i$ is equal to the refractive index of the cladding 12, and the relative refractive index difference between the outer core 11$o$ and the cladding 12 is 1%. A ratio $D_1/D_2$ is set to 0.5, which is the ratio of a diameter $D_1$ of the inner core 11$i$ to a diameter $D_2$ of the outer core 11$o$ in FIGS. 4A, 4B and 4C, and $D_2$ is changed to vary the cutoff wavelength of the $LP_{11}$ mode light beam.

As illustrated in FIG. 5, also in the case in which the refractive index profile of the core 11 is a ring type, it was revealed that the normalized $\Delta\Gamma$ becomes smaller as $\lambda c$ comes closer from $\lambda$min to $\lambda$max and that the decrease rate of the normalized $\Delta\Gamma$ to $\lambda c$ becomes greater in a region in which $\lambda c$ comes closer to $\lambda$min. Thus, also in the amplification optical fiber 10 according to the embodiment, Expression (1) is preferably satisfied. In the case of the amplification optical fiber 10 according to the embodiment, Expression (1) is satisfied, and thus the normalized $\Delta\Gamma$ can be made 0.16 or less. The amplification optical fiber 10 satisfies Expression (2), and thus the normalized $\Delta\Gamma$ can be made 0.05 or less. Consequently, also in the embodiment, the amplification optical fiber 10 satisfies Expression (1), and thus, differential modal gain can be made sufficiently small. The amplification optical fiber 10 satisfies Expression (2), and thus differential modal gain can be made much smaller.

Note that, FIG. 5 illustrates the relationship between the cutoff wavelength $\lambda c$ of the highest mode light beam in the propagated light beams and the normalized $\Delta\Gamma$, in the case in which the amplification optical fiber is a two-mode optical fiber. Also in the case in which the amplification optical fiber 10 is a three-mode optical fiber, a four-mode optical fiber, or a five-mode optical fiber or more, the result is almost equivalent to the result in FIG. 5.

As described above, in accordance with the amplification optical fiber 10 according to the embodiment, regardless of the refractive index profile of the core 11, Expression (1) is satisfied, and thus differential modal gain can be made sufficiently small. Expression (2) is satisfied, and thus differential modal gain can be made much smaller.

<Description of an Optical Fiber Amplifier>

Next, referring to FIG. 6, an optical fiber amplifier using the amplification optical fiber 10 will be described. Note that, the refractive index profile of the core 11 of the amplification optical fiber 10 may be a step type or a ring type as described above, or may be other refractive index profiles.

Figure 6:
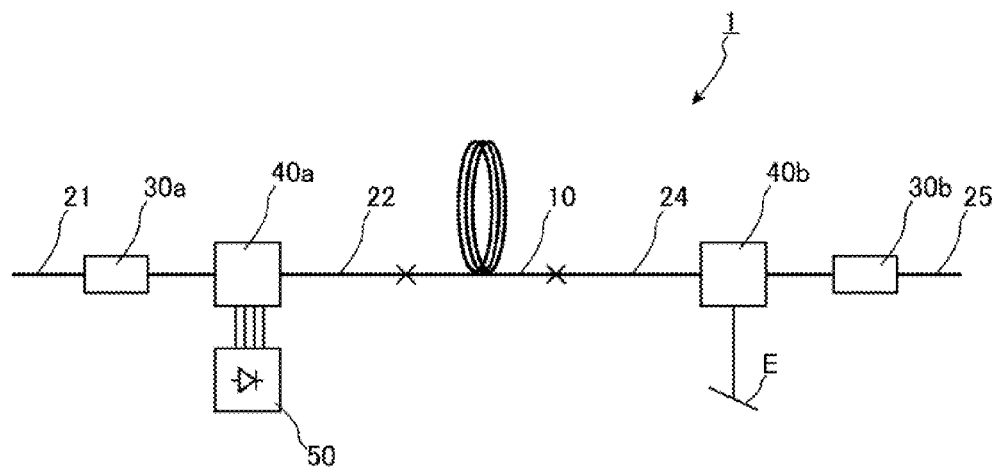
FIG. 6 is a diagram of an optical fiber amplifier according to an embodiment of the present invention.

FIG. 6 is a diagram of an optical fiber amplifier according to an embodiment. As illustrated in FIG. 6, an optical fiber amplifier 1 according to the embodiment includes an optical fiber 21 operable to propagate a signal light beam to be amplified, an optical isolator 30$a$ provided in the midway point of the optical fiber 21, a WDM coupler 40$a$ connected to the optical fiber 21, an optical fiber 22 having one end connected to the WDM coupler 40$a$, an amplification optical fiber 10 having one end connected to the other end of the optical fiber 22, an optical fiber 24 having one end connected to the other end of the amplification optical fiber 10, a WDM coupler 40$b$ connected to the other end of the optical fiber 24, an optical fiber 25 connected to the WDM coupler 40$b$, an optical isolator 30$b$ provided in the midway point of the optical fiber 25, and a pumping light source 50 as main configurations.

The optical fiber 21 is a few-mode optical fiber operable to propagate signal light beams in individual modes propagated through the amplification optical fiber 10 in a predetermined wavelength range, such as the C-band, in which signals are superposed on the propagated light beams in the individual modes. These signal light beams are propagated through the optical fiber 21 toward the WDM coupler 40$a$ side.

The optical isolator 30$a$ provided in the midway point of the optical fiber 21 transmits the signal light beams propagated from the optical fiber 21 side to the WDM coupler 40$a$ side, and avoids the transmission of the light beams propagated toward the opposite side. Thus, the entrance of light beams from the optical isolator 30$a$ to the optical fiber 21 is avoided, the light beams traveling in the direction opposite to the traveling direction of the signal light beams because of the reflection unnecessarily taken place in the inside of the optical fiber amplifier 1, for example.

The pumping light source 50 emits a multimode pumping light beam at a wavelength of 980 nm, for example. The emitted pumping light, beam is entered to the WDM coupler 40$a$. Note that, in the case of adjusting the power of pumping light beams in individual modes, it is only required that the $LP_{01}$ mode light beam be emitted for each mode and light beams in individual modes be excited from the emitted light beams.

To the WDM coupler 40$a$, the signal light beams are entered from the optical fiber 21, and the pumping light beams are entered from the pumping light source 50. The WDM coupler 40$a$ multiplexes the signal light beams with the pumping light beams, which have been entered, and enters the light beams to the optical fiber 22. The optical fiber 22 is similarly configured as the optical fiber 21.

The amplification optical fiber 10 connected to the optical fiber 22 preferably satisfies Expressions (1) and (2). To the amplification optical fiber 10, the signal light beams in the individual modes propagated from the optical fiber 21 and the pumping light beams emitted from the pumping light source 50 are entered. The amplification optical fiber 10 satisfies Expression (1). Thus, in the signal light beams in the individual modes entered to the amplification optical fiber 10 and propagated through the core 11, the difference $\Delta\Gamma$ is reduced, which is the difference between the sum total $\Gamma_{01}$ of the power of the signal light beam in the fundamental mode propagated through the region doped with a rare earth element and the sum total $\Gamma_{max}$ of the power of the signal light beam in the highest mode propagated through the doped region. Thus, the difference between the sum totals of power of the light beams in the individual modes is reduced. The rare earth element pumped with the pumping light beams causes stimulated emission in the signal light beams in the individual modes for amplifying the signal light beams in the individual modes.

In this amplification, the difference between the sura totals of power is reduced in the region doped with a rare earth element for each of the light beams in the individual modes as described above. Thus, the differential modal gain between the signal light beams in the individual modes is reduced. Consequently, the signal light beams in the individual modes, which are amplified with the differential modal gain being reduced, are emitted from the amplification optical fiber 10.

The optical fiber 24 connected to the amplification optical fiber 10 is configured similarly as the optical fiber 22. The signal light beams and the excess pumping light beams emitted from the amplification optical fiber 10 are entered to the optical fiber 24, and propagated through the optical fiber 24.

The signal light beams and the excess pumping light beams entered from the optical fiber 24 to the WDM coupler 40b are separated at the WDM coupler 40b. The separated excess pumping light beams are terminated at a terminating device E. The signal light beams are entered to the optical fiber 25, and propagated through the optical fiber 25.

The optical isolator 30b provided in the midway point of the optical fiber 25 transmits the signal light beams propagated from the WDM coupler 40b through the optical fiber 25, and reduces the transmission of the light beams propagated toward the WDM coupler 40b. Thus, the signal light beams are transmitted through the optical isolator 30b for emission.

In accordance with the optical fiber amplifier 1 according to the embodiment, differential modal gain is reduced in the amplification optical fiber 10, allowing the emission of few-mode light beams with a low differential modal gain.

As described above, the embodiments of the present invention are described as examples. However, the embodiments of the present invention are not limited to these embodiments.

For example, in FIGS. 4A, 4B and 4C, the relative refractive index difference between the inner core 11i and the cladding 12 is set to zero percent. However, the relative refractive index difference can have any percentage.

In the foregoing embodiments, for the refractive index of the core 11, a step type refractive index and a ring type refractive index are described. However, the core 11 may have a graded-index (GI) type refractive index, in which the center is high. Even in the case in which the amplification optical fiber 10 is an optical fiber having a GI refractive index. Expression (1) is satisfied. Thus, the difference $\Delta\Gamma$ between $\Gamma_{01}$ and $\Gamma_{max}$ can be made smaller, and differential modal gain can be reduced.

As described above, in accordance with the embodiments of the present invention, there are provided an amplification optical fiber that can reduce differential modal gain and an optical fiber amplifier, which can be expected for use in the field of few-mode optical communications.

The invention claimed is:

1. An amplification optical fiber operable to propagate light beams in a plurality of modes in a predetermined wavelength range through a core doped with a rare earth element,, wherein Expression (1) is satisfied, where a cutoff wavelength of a propagated highest mode light beam is defined as λmax, under conditions in which the cutoff wavelength of the highest mode light beam is defined as λc, a shortest, wavelength of the wavelength range is defined as λmin, and a cutoff wavelength of a second-highest mode light beam to the highest, mode light beam is λmin.

$$\lambda c > 0.5\ \lambda min + 0.5\ \lambda max \tag{1}$$

2. The amplification optical fiber according to claim 1, wherein

Expression (2) is satisfied.

$$\lambda c > 0.25\ \lambda min + 0.7\ \lambda max \tag{2}$$

3. The amplification optical fiber according to claim 1, wherein the predetermined wavelength range is a range of 1,530 to 1,565 nm, inclusive.

4. The amplification optical fiber according to claim 1, wherein:

the core has an inner core doped with no rare earth element and an outer core surrounding an outer circumferential surface of the inner core and doped with a rare earth element; and a relative refractive index difference between the inner core and a cladding is smaller than a relative refractive index difference between the outer core and the cladding.

5. The amplification optical fiber according to claim 1, wherein the plurality of modes is an $LP_{01}$ mode and an $LP_{11}$ mode.

6. The amplification optical fiber according to claim 1, wherein the plurality of modes is an $LP_{01}$ mode, an $LP_{11}$ mode, an $LP_{21}$ mode, and an $LP_{02}$ mode.

7. An optical fiber amplifier comprising:

the amplification optical fiber according to claim 1; and a pumping light source operable to emit pumping light entered to the core.

* * * * *